(12) United States Patent
Rao (10) Patent No.: US 11,564,061 B2
(45) Date of Patent: Jan. 24, 2023

(54) TRANSMISSION OF LOCATION INFORMATION TO DEVICES ALONG WITH WIRELESS EMERGENCY ALERT MESSAGES USING CELL BROADCAST

(71) Applicant: NOKIA TECHNOLOGIES OY, Espoo (FI)

(72) Inventor: Nagaraja Rao, Boca Raton, FL (US)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 16/275,021

(22) Filed: Feb. 13, 2019

(65) Prior Publication Data

US 2019/0253842 A1 Aug. 15, 2019

Related U.S. Application Data

(60) Provisional application No. 62/630,067, filed on Feb. 13, 2018.

(51) Int. Cl.
*H04W 4/029* (2018.01)
*H04W 4/90* (2018.01)
*H04W 4/06* (2009.01)

(52) U.S. Cl.
CPC .......... *H04W 4/029* (2018.02); *H04W 4/90* (2018.02); *H04W 4/06* (2013.01)

(58) Field of Classification Search
CPC .............................. H04W 4/029; H04W 4/90
USPC ....................................................... 455/405
See application file for complete search history.

(56) References Cited

U.S. PATENT DOCUMENTS

| 9,271,135 | B2 | 2/2016 | Dunn et al. | |
| 10,127,777 | B1* | 11/2018 | Agrawal | G08B 5/38 |
| 2006/0273884 | A1* | 12/2006 | Watkins | G08B 27/00 |
| | | | | 340/425.5 |

(Continued)

FOREIGN PATENT DOCUMENTS

| CN | 104798390 A | 7/2015 |
| CN | 105917680 A | 8/2016 |

(Continued)

OTHER PUBLICATIONS

Kimberly Zeitz et al., "Designing an Optimized Alert System Based on Geospatial Location Data," IEEE Spectrum, Browse Conferences, System Sciences (HICSS), 2014.

(Continued)

*Primary Examiner* — Charles N Appiah
*Assistant Examiner* — Nicole M Louis-Fils
(74) *Attorney, Agent, or Firm* — Squire Patton Boggs (US) LLC (57) ABSTRACT

Various communication systems may benefit from the appropriate provision of location information. For example, certain wireless communication systems may benefit from the transmission of location information to devices along with wireless emergency alert messages using cell broadcast. A method can include receiving, at a user equipment, coordinates for an alert area for a wireless emergency alert. The method can also include determining, at the user equipment, whether the user equipment is within the alert area based on the coordinates. The method can further include processing the wireless emergency alert at the user equipment in accordance with the determination.

4 Claims, 10 Drawing Sheets

(56) References Cited

U.S. PATENT DOCUMENTS

| | | | |
|---|---|---|---|
| 2009/0176476 A1 | 7/2009 | Foladare et al. | |
| 2009/0239554 A1 | 9/2009 | Sammour et al. | |
| 2011/0103302 A1* | 5/2011 | Hall | A63F 13/211 370/328 |
| 2013/0278418 A1* | 10/2013 | Vallaire | G08B 27/00 340/539.13 |
| 2014/0032114 A1 | 1/2014 | Titus et al. | |
| 2014/0050137 A1* | 2/2014 | Alberth, Jr. | H04W 4/90 370/312 |
| 2014/0057587 A1 | 2/2014 | Overby | |
| 2014/0134970 A1 | 5/2014 | Pazos et al. | |
| 2014/0273911 A1 | 9/2014 | Dunn et al. | |
| 2015/0147995 A1* | 5/2015 | Bontu | H04W 4/90 455/404.1 |
| 2015/0201316 A1* | 7/2015 | Khatibi | H04W 4/02 455/404.2 |
| 2016/0247383 A1* | 8/2016 | Kassab | H04W 4/08 |
| 2017/0034681 A1* | 2/2017 | Netto | H04L 12/1895 |
| 2018/0139762 A1* | 5/2018 | Cho | H04W 4/90 |
| 2018/0176749 A1* | 6/2018 | Hussaini | H04H 20/59 |
| 2018/0324757 A1* | 11/2018 | Chai | H04W 76/27 |
| 2019/0246260 A1* | 8/2019 | Edge | H04W 4/90 |
| 2021/0021974 A1* | 1/2021 | Kim | H04W 4/12 |

FOREIGN PATENT DOCUMENTS

| | | | |
|---|---|---|---|
| JP | 2010/532026 A | 9/2010 | |
| JP | 2017/508353 A | 3/2017 | |
| TW | 201735671 A * | 10/2017 | H04W 4/40 |
| WO | 2013/173846 A1 | 11/2013 | |
| WO | 2015/105793 A1 | 7/2015 | |
| WO | WO 2016/210110 A1 | 12/2016 | |

OTHER PUBLICATIONS

"Wireless Emergency Alerts Arbitrary-Size Location-Aware Targeting," Final Report, Homeland Security, Jun. 2015.

3GPP TS 23.041 V15.0.0 (Dec. 2017), Technical Specification, 3rd Generation Partnership Project; Technical Specification Group Core Network and Terminals; Technical realization of Cell Broadcast Service (CBS) (Release 15), Dec. 2017.

International Search Report and Written Opinion issued in corresponding International Patent Application No. PCT/US2019/017868 dated May 20, 2019.

International Search Report and Written Opinion International Application No. PCT/US2019/017863 dated Apr. 12, 2019.

Vietnamese Office Action issued in corresponding Vientnamese Patent Application No. 1-2020-04681 dated Oct. 13, 2020.

Chinese Office Action issued in corresponding Chinese Patent Application No. 201980020224.X dated Mar. 9, 2021.

Korean Office Action issued in corresponding Korean Patent Application No. 10-2020-7026113 dated Aug. 18, 2021.

Japanese Office Action dated Sep. 10, 2021 in corresponding Japanese Patent Application No. 2020-564821.

3GPP TSG-RAN WG3 Meeting #101, Gothenburg, Sweden, Aug. 20-24, 2018, R3-184563, Nokia, Nokia Shanghai Bell, AT&T, One2many, Qualcomm Incorporated, Sprint, SyncTechno Inc., T-Mobile USA, Device-based geo-fencing, 4 pages.

Chinese Office Action issued in corresponding Chinese Patent Application No. 201980020224.X dated Mar. 25, 2022.

European Office Action issued in corresponding European Patent Application No. 19 709 593.8-1218 dated Apr. 5, 2022.

Chinese Office Action issued in corresponding Chinese Patent Application No. 201980020224.X dated Oct. 11, 2021.

Indian Office Action issued in correspondign Indian Patent Application No. 202047038273 dated Nov. 26, 2021.

Japanese Office Action issued in corresponding Japanese Patent Application No. 2020-564821 dated Sep. 10, 2021.

Japanese Office Action issued in corresponding Japanese Patent Application No. 2020-546821 dated May 31, 2022.

Federal Communications Commission, FCC 18-4, Wireless Emergency Alerts, Amendments to Part 11 of the Commission's Rules Regarding the Emergency Alert System, PS Docket No. 15-91 and PS Docket No. 15-94, Released Jan. 31, 2018, 60 pages.

Japanese Office Action issued in corresponding Japanese Patent Application No. 2020-564821 dated Oct. 13, 2022.

Thailand Office Action issued in corresponding Thailand Patent Application No. 2001004530 dated Nov. 24, 2022.

* cited by examiner

| PARAMETER |
|---|
| Message Type |
| Message Identifier |
| Serial-Number |
| List of TAIs |
| Warning Area List |
| Repetition-Period E-UTRAN |
| Extended Repetition-Period |
| No-of-Broadcasts-Requested |
| Data Coding Scheme |
| Warning Message Content E-UTRAN |
| OMC ID |
| Concurrent Warning Message Indicator |
| Send Write-Replace-Warning-Indication |
| Global eNB ID |
| *WEA Area Coordinates* |

1> if the *SystemInformationBlockType12* contains a complete warning message:

2> forward the received warning message, *messageIdentifier*, *serialNumber* and *dataCodingScheme* and WEA area coordinates to upper layers;

2> continue reception of *SystemInformationBlockType12*;

1> else:

2> if the received values of *messageIdentifier* and *serialNumber* are the same (each value is the same) as a pair for which a warning message is currently being assembled:

3> store the received *warningMessageSegment*;

3> if all segments of a warning message have been received:

4> assemble the warning message from the received *warningMessageSegment*;

4> forward the received warning message, *messageIdentifier*, *serialNumber* and *dataCodingScheme* and WEA area coordinates to upper layers;

4> stop assembling a warning message for this *messageIdentifier* and *serialNumber* and delete all stored information held for it;

3> continue reception of *SystemInformationBlockType12*;

2> else if the received values of *messageIdentifier* and/or *serialNumber* are not the same as any of the pairs for which a warning message is currently being assembled:

3> start assembling a warning message for this *messageIdentifier* and *serialNumber* pair;

3> store the received *warningMessageSegment*;

3> continue reception of *SystemInformationBlockType12*;

| CB Data: Today (an example) | CB Data: With WEA area coordinates (same example) |
|---|---|
| Number of Pages: 4<br><br>Page 1, Octet 1 to 82: First 93 characters of WEA text with 5 bits padded<br><br>Page 1 length: 93<br><br>Page 2, Octet 1 to 82: Following 93 characters of WEA text with 5 bits padded<br><br>Page 2 length: 93<br><br>Page 3, Octet 1 to 82: Following 93 characters of WEA text with 5 bits padded<br><br>Page 3 length: 93<br><br>Page 4, Octet 1 to 82: Last 81 characters of WEA text with 89 bits padded<br><br>Page 4 length: 81 | Number of Pages: 4;<br><br>Page 1, Octet 1 to 82: X (where X ≤ 93) characters of WEA area coordinates and first Y (where Y + X = 93) characters of WEA text with 5 bits padded.<br><br>Page 1 length: X + Y (where X ≤ 93, X+Y = 93)<br><br>Page 2: Following 93 characters of WEA text with 5 bits padded.<br><br>Page 2 length: 93<br><br>Page 3, Octet 1 to 82: Following 93 characters of WEA text with 5 bits padded<br><br>Page 3 length: 93<br><br>Page 4, Octet 1 to 82: Last 81 characters of WEA text with 5 bits padded<br><br>Page 4 length: 81 |

TRANSMISSION OF LOCATION INFORMATION TO DEVICES ALONG WITH WIRELESS EMERGENCY ALERT MESSAGES USING CELL BROADCAST

CROSS-REFERENCE TO RELATED APPLICATIONS

This application claims priority from U.S. provisional patent application No. 62/630,067 filed on Feb. 13, 2018. The contents of this earlier filed application are hereby incorporated in their entirety.

BACKGROUND

Various communication systems may benefit from the appropriate provision of location information. For example, certain wireless communication systems may benefit from the transmission of location information to devices along with wireless emergency alert messages using cell broadcast.

DESCRIPTION OF THE RELATED ART

One aspect of wireless technology relates to emergency warning notifications that are sent to mobile devices through the fourth generation (4G) network/long term evolution (LTE) infrastructure of Commercial Mobile Service Providers (CMSPs).

A part of the network functions involved in the broadcast of wireless emergency alert (WEA) text messages belong to the government in the sense that those network functions are managed by the government. A part of the network functions involved in the broadcast of WEA text messages belong to the CMSP (Commercial Mobile Service Providers).

Figure 1:
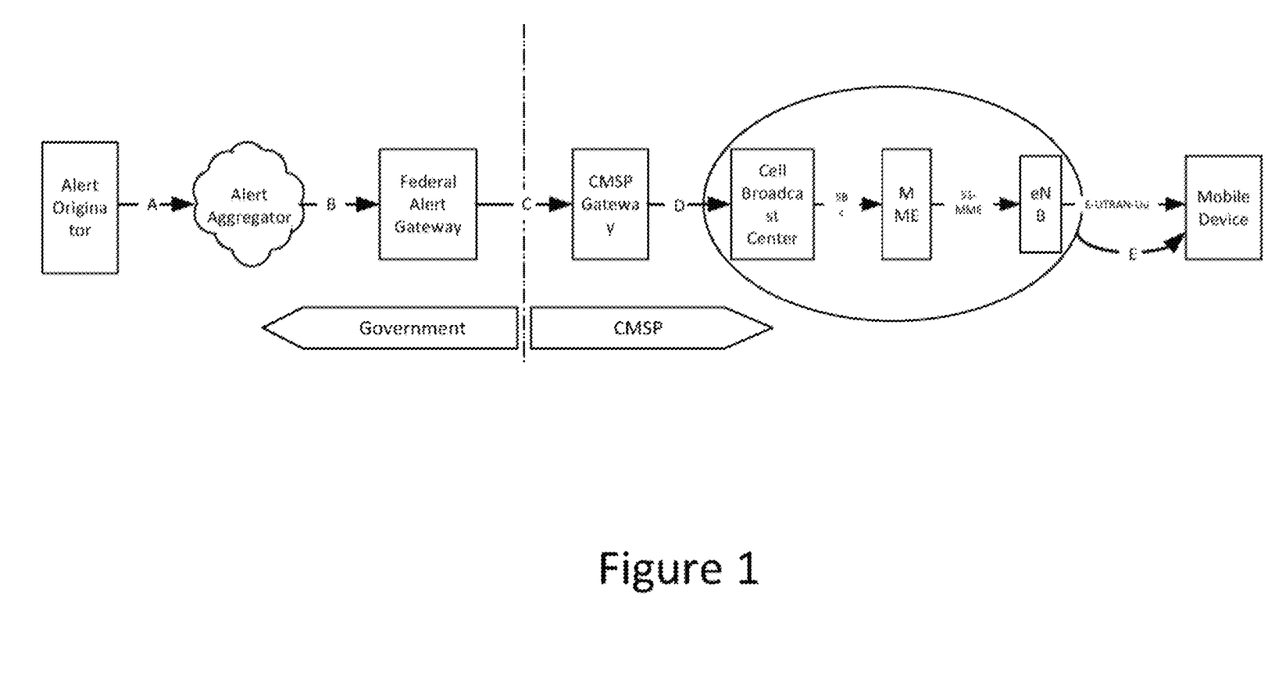
FIG. 1 provides an end-to-end architecture for WEA message broadcast to the mobile devices in LTE.

FIG. 1 provides an end-to-end architecture for WEA message broadcast to the mobile devices in LTE. As shown in FIG. 1, an Alert Originator, which can be some government agency, can compose the WEA text message and can identify the affected area. The WEA text message along with affected area is sent to the Alert Aggregator over the A interface and then to the Federal Alert Gateway over the B interface. The Federal Alert Gateway sends the WEA text message along with the affected area to the CMSP Gateway over the C interface. The CMSP Gateway sends the WEA text message along with the affected area to the CMSP infrastructure over the D-interface. The CMSP infrastructure broadcasts the WEA text message to the mobile devices in the affected cell/sectors over the E-interface. The method used to do such broadcast is known as Cell Broadcast Service (CBS).

Within the CMSP infrastructure, the Cell Broadcast Center (CBC) identifies the cell/sectors in the affected area and then distributes the WEA text message to MMEs/eNBs that serve those cell/sectors. The eNBs broadcast the WEA text message to the mobile devices in the affected cell/sectors using the System Information Block (SIB) messages.

As shown in FIG. 1, a part of the network functional nodes involved in the broadcast of WEA text messages belong to the government in the sense that those network functional nodes are managed by the government, and a part of the network functional nodes involved in the broadcast of WEA text messages belong to the CMSP. The details of C-interface, D-interface and E-interface for LTE are standardized in Alliance for Telecommunications Industry Solutions (ATIS). The details of the SBc, S1-MME and E-UTRAN-Uu are defined in 3GPP specifications.

SUMMARY

In accordance with some example embodiments, a method may include receiving, at an access node, coordinates for an alert area for a wireless emergency alert. The method may also include sending, from the access node, the coordinates to a user equipment. The method may further include sending the wireless emergency alert to the user equipment.

In accordance with some example embodiments, an apparatus may include means for receiving coordinates for an alert area for a wireless emergency alert. The apparatus may also includes means for sending the coordinates to a user equipment. The apparatus may further include means for sending the wireless emergency alert to a user equipment.

In accordance with some example embodiments, an apparatus may include at least one processor and at least one memory including computer program code. The at least one memory and the computer program code may be configured to, with the at least one processor, cause the apparatus at least to receive coordinates for an alert area for a wireless emergency alert. The at least one memory and the computer program code may also be configured to, with the at least one processor, cause the apparatus at least to send the coordinates to a user equipment. The at least one memory and the computer program code may further be configured to, with the at least one processor, cause the apparatus at least to send the wireless emergency alert to a user equipment.

In accordance with some example embodiments, a non-transitory computer readable medium can be encoded with instructions that may, when executed in hardware, perform a method. The method may include receiving coordinates for an alert area for a wireless emergency alert. The method may also include sending the coordinates to a user equipment. The method may further include sending the wireless emergency alert to a user equipment.

In accordance with some example embodiments, a computer program, embodied on a non-transitory computer readable medium, the computer program, when executed by a processor, causes the processor to perform a method. The method may include receiving coordinates for an alert area for a wireless emergency alert. The method may also include sending the coordinates to a user equipment. The method may further include sending the wireless emergency alert to the user equipment.

In accordance with some example embodiments, an apparatus may include circuitry configured to receive coordinates for an alert area for a wireless emergency alert. The apparatus may also include circuitry configured to send the coordinates to a user equipment. The apparatus may further include circuitry configured to send the wireless emergency alert to a user equipment.

In accordance with some example embodiments, a method may include receiving, at a user equipment, coordinates for an alert area for a wireless emergency alert. The method may also include determining, at the user equipment, whether a user equipment is within the alert area based on the coordinates. The method may further include processing the wireless emergency alert at the user equipment in accordance with the determination.

In accordance with some example embodiments, an apparatus may include means for receiving coordinates for an alert area for a wireless emergency alert. The apparatus may also include means for determining whether the apparatus is within the alert area based on the coordinates. The apparatus may further include means for processing the wireless emergency alert in accordance with the determination.

In accordance with some example embodiments, an apparatus may include at least one processor and at least one memory including computer program code. The at least one memory and the computer program code may be configured to, with the at least one processor, cause the apparatus at least to receive coordinates for an alert for a wireless emergency alert. The apparatus may also include at least one memory and the computer program code configured to, with the at least one processor, cause the apparatus at least to determine whether the apparatus is within the alert area based on the coordinates. The apparatus may further include at least one memory and the computer program code configured to, with the at least one processor, cause the apparatus at least to process the wireless emergency alert at the user equipment in accordance with the determination.

In accordance with some example embodiments, a non-transitory computer readable medium can be encoded with instructions that may, when executed in hardware, perform a method. The method may include receiving coordinates for an alert area for a wireless emergency alert. The method may also include determining whether the user equipment is within the alert area based on the coordinates. The method may further include processing the wireless emergency alert at the user equipment in accordance with the determination.

In accordance with some example embodiments, a computer program, embodied on a non-transitory computer readable medium, the computer program, when executed by a processor, causes the processor to perform a method. The method may include receiving coordinates for an alert area for a wireless emergency alert. The method may also include determining whether a user equipment is within the alert area based on the coordinates. The method may further include processing the wireless emergency alert at the user equipment in accordance with the determination.

In accordance with some embodiments, an apparatus may include circuitry configured to receive coordinates for an alert area for a wireless emergency alert. The apparatus may also include circuitry configured to determine whether the apparatus is within the alert area based on the coordinates. The apparatus may further include circuitry configured to process the wireless emergency alert in accordance with the determination.

BRIEF DESCRIPTION OF THE DRAWINGS

For proper understanding of the invention, reference should be made to the accompanying drawings, wherein.

DETAILED DESCRIPTION

With CBS, the CBC sends the text messages to the eNBs (via MME) that are serving the area. The area is identified by the CBC in the form of cell/sectors. All mobile devices in the cell/sector can receive the CBS text messages.

The Federal Communications Commission (FCC), however, is not happy with this process because, in some situation, the alert may be applicable to only part of the cell or sector. Also, depending on the method used to select a cell/sector, in some situations the alert messages may reach the mobile devices that are outside the coverage area and, in some other situations, the alert may not reach the mobile devices that are supposed to have received the alert. This is referred to overshooting and undershooting.

Figure 2:
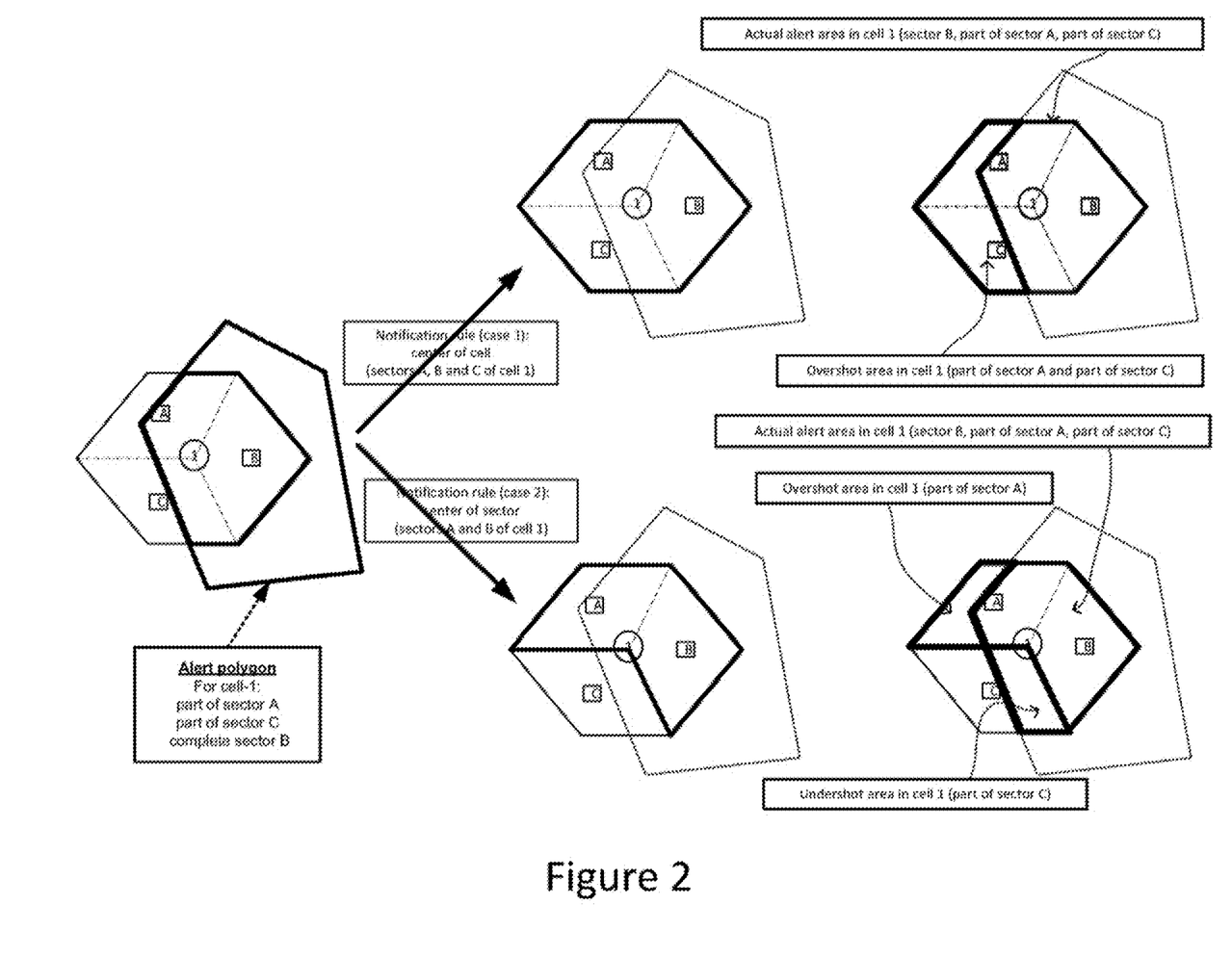
FIG. 2 illustrates overshooting and undershooting.

FIG. 2 illustrates overshooting and undershooting. More particularly, FIG. 2 shows an example where the affected area for a WEA is identified with a polygon. The polygon may cover many cell/sectors, however, the FIG. 2 focuses on one cell, identified within the diagram as cell 1. The cell has three sectors identified within the diagram as A, B and C.

As shown on the left most part of the diagram in FIG. 2, the alert polygon covers the complete sector B of cell-1, but only a part of sector A and sector C of cell-1. In this example scenario, the FCC wants to broadcast the WEA text messages only to those mobile devices that are in sector B and part of sector A and sector C, from the perspective of cell-1. However, such a focused distribution is not possible in the current cell broadcast technique. That is because the limitations in the method used to identify the cell/sectors.

There may be many ways a cell/sector may be identified. Two examples are illustrated in FIG. 2. One notification rule, for a first case, may be to notify to all mobile devices in the sectors when the center of the cell (or eNB) is inside the polygon. As a result, because the center of cell 1 is inside the polygon, with this rule, all mobile devices in sector A, B and C will be notified. Obviously, some mobile devices in sector A and sector C that are outside the polygon will also receive the alerts. This is called an overshoot scenario.

Another notification rule, for a second case, may be notify all mobile devices in the sectors when the center of the sector is inside the polygon. As a result, because the center of sector A and B are inside the polygon and center of sector C is outside the polygon, all mobile devices in sectors A and B will be notified and none of the mobile devices in sector C will be notified. Obviously, some mobile devices in sector A are outside the polygon and some mobile devices in sector C are inside the polygon. The devices that are outside the polygon in sector A will receive the alerts (overshoot case) and mobile devices that are inside the polygon in sector C will not receive the alerts. This latter case is called undershoot scenario.

In a cell broadcast service architecture, alert text messages are sent to the mobile devices as cell broadcast (CB) data and within the SIB, the CB data is identified as warning message contents. The mobile devices display the alert text present in the warning message contents on the display screen. For LTE devices, the maximum number of display characters that can be included in a WEA text message is 360.

Certain embodiments are based on the idea of transporting WEA area coordinates as a separate field within the system information block and then modifying the device application to use the coordinates from that separate field to determine whether it is in within the WEA area before displaying the message. With this idea, the mobile devices can use the existing logic to display the message, perform the duplicate detection, and use the existing Message Identifier values. The alert originator may have all the 360 characters available to compose the display text.

Figure 3:
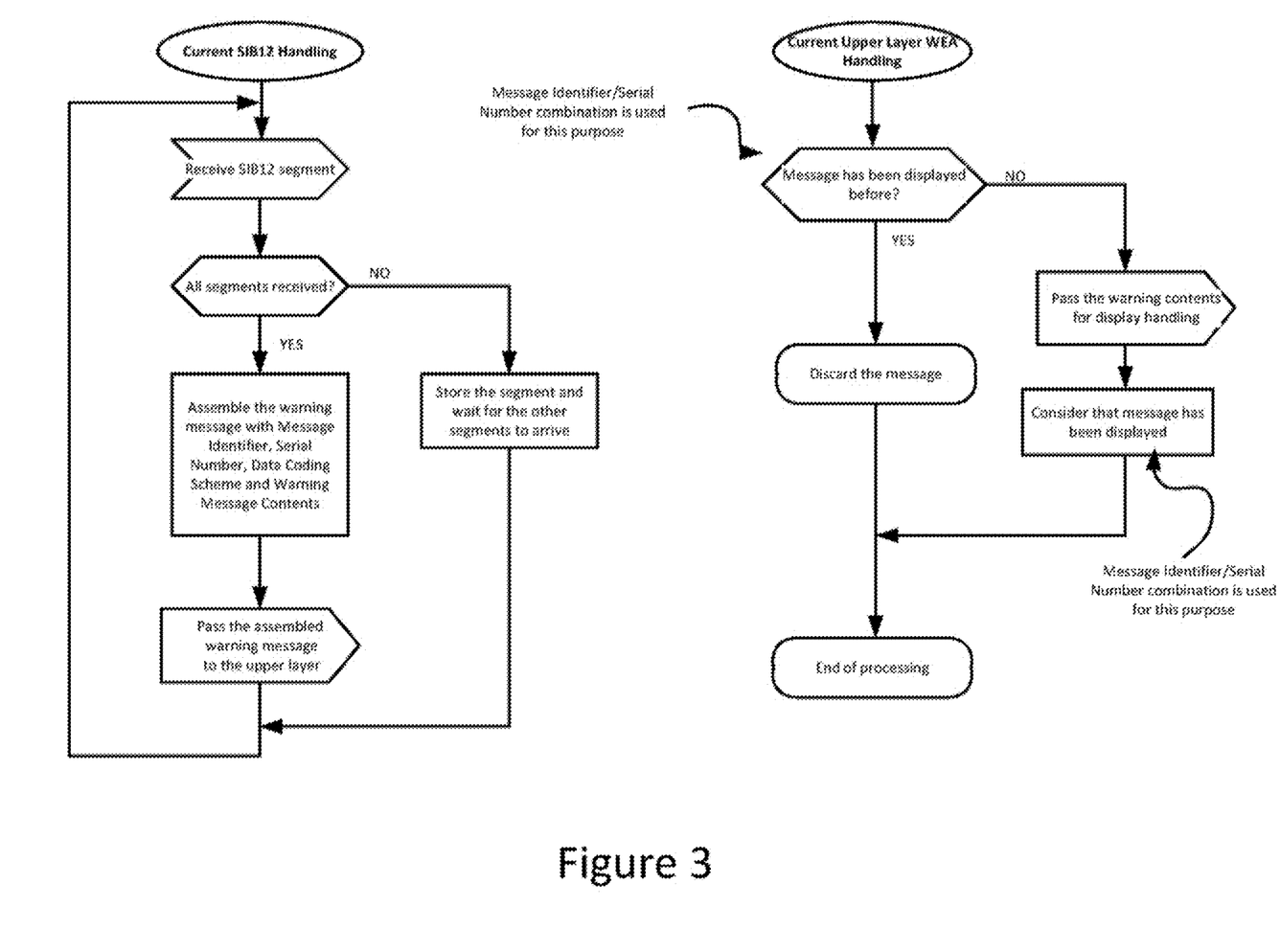
FIG. 3 illustrates the current handling of SIB12 in mobile device logic.

To carry the WEA messages with the WEA area coordinates either SIB12 can be enhanced or a new SIB for this purpose can be visualized. FIG. 3 illustrates the current handling of SIB12 in mobile device logic. More particularly, FIG. 3 illustrates the current handling of SIB12 and the upper layer processing of the WEA message at a conceptual level.

The first part of the flow-chart shown in FIG. 3 is based on the pseudo-code specified in 3GPP TS 36.331. The second part of the flow-chart shown in FIG. 3 is a high level conceptualization of upper layer processing of a WEA message. The upper layer processing first checks whether the WEA text was previously displayed. If it was previously displayed, a mobile device would discard the message. If it was not previously displayed, then the device can display the text on the screen and treat that message as now having been considered to be displayed.

Figure 4:
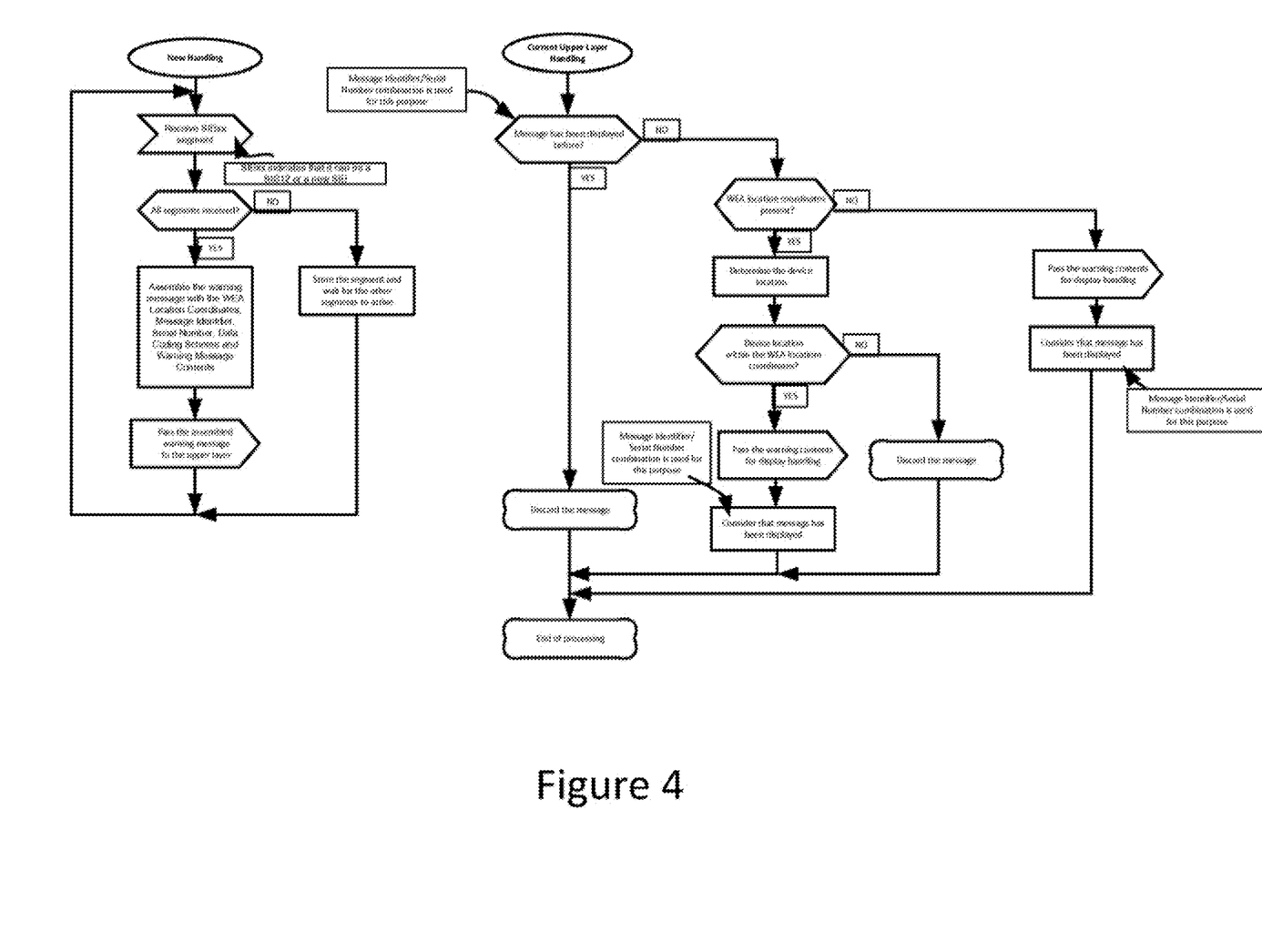
FIG. 4 illustrates enhanced handling of system information block (SIB12 or new SIB) that carries the WEA area coordinates, at a conceptual level, according to certain embodiments.

FIG. 4 illustrates enhanced handling of system information block (SIB12 or new SIB) that carries the WEA area coordinates, at a conceptual level, according to certain embodiments. The first part of the flow-chart shown in FIG. 4 basically follows the pseudo-code of SIB12 handling, with one change: this SIB can now can expect to receive WEA area coordinates and then pass on the WEA area coordinates to the upper layer for processing. The second part of the flow-chart in FIG. 4 shows the enhanced upper layer processing of the WEA message.

Independent of which SIB is used to transport the WEA message from an eNB to the mobile devices, this enhanced upper layer processing can be the same. In other words, the enhancement can be based on the changes made to the current upper layer processing of a WEA message.

As shown in the flow-chart, if the message was not displayed before, then first thing the enhancement can do is to check whether the WEA area coordinates are present. If not present, the mobile devices can follow the current logic to display the WEA text on the device screen. If the WEA area coordinates are present, then the mobile device can find out its own current location, determine whether its own current location is within the WEA area coordinates. When the mobile device finds out that it is within the WEA area coordinates, it can display the WEA text on the device screen using the current logic and record the Message Identifier/Serial Number to enable the duplication detection logic on a subsequently received SIB. If the mobile device finds out that it is not within the WEA area coordinates, it can discard the message.

In this approach, a mobile device can move to WEA area later in time and in that case when the message is repeated by the eNB, the enhanced upper layer processing shown in FIG. 4 will enable the mobile device that had received and discarded the WEA message (because it was outside the WEA area) to display the WEA text on the device screen, because now it is within the WEA area.

The CBC, MME, eNB and the mobile devices can be modified to practice certain embodiments. Also, WRWR message can be enhanced to carry the WEA coordinates and the SIB12 can be enhanced to carry the WEA area coordinates, or a new SIB can be defined.

Figure 5:
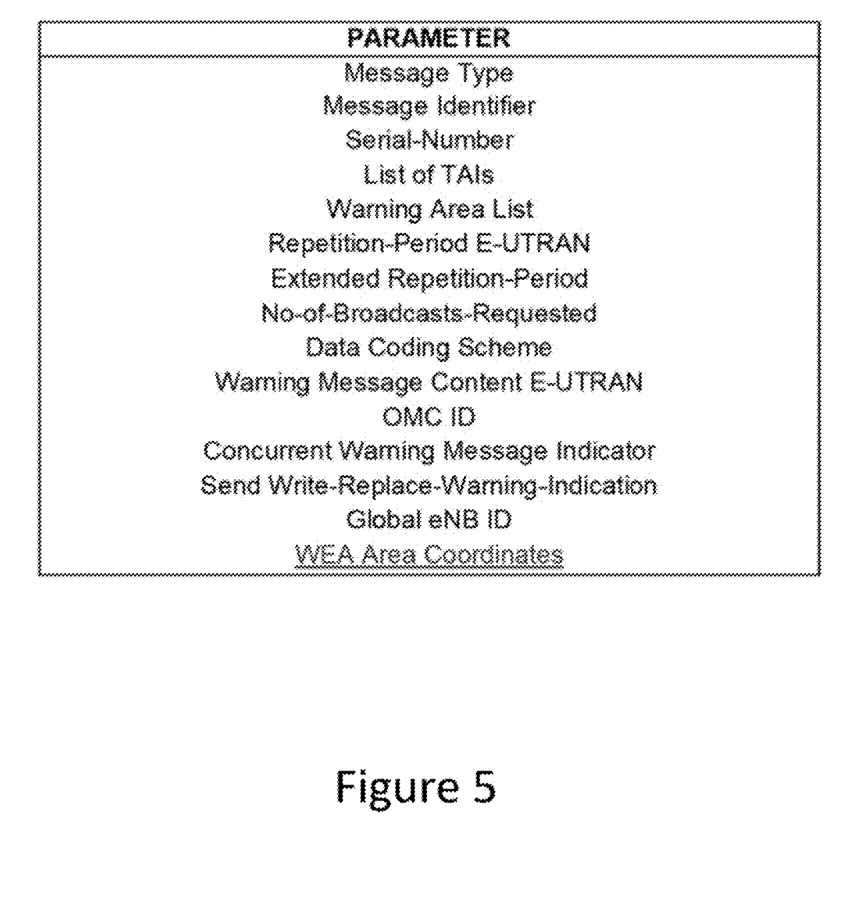
FIG. 5 illustrates a table showing various fields of a WRWR message, according to certain embodiments.

The changes to WRWR message can include adding a new field to add the WEA area coordinates. FIG. 5 illustrates a table showing various fields of a WRWR message, according to certain embodiments.

In the current implementation of WEA, the Federal Alert Gateway, as shown in FIG. 1, can send the WEA area coordinates to the CMSP GW. However, in the current implementation, the WEA area can also be specified via geocodes. Perhaps, the C-interface specification can rely on presence WEA area coordinates as a mandatory requirement. The CMSP GW can pass the WEA coordinates to the CBC with an indication that asks the CBC to pass the WEA area coordinates to the mobile devices.

In the current implementation, the CBC uses the WEA area coordinates (or geocodes) to determine the list of TAs and the Warning Area List. The CBC can now pass the WEA area coordinates to the MME in the WRWR message.

The MME can pass the WEA area coordinates from the WRWR message that it receives from the CBC to the WRWR message sent to the eNB s.

The eNB can receive the WEA area coordinates present in the WRWR message and can populate the System Information Block with the WEA area coordinates.

Figure 6:
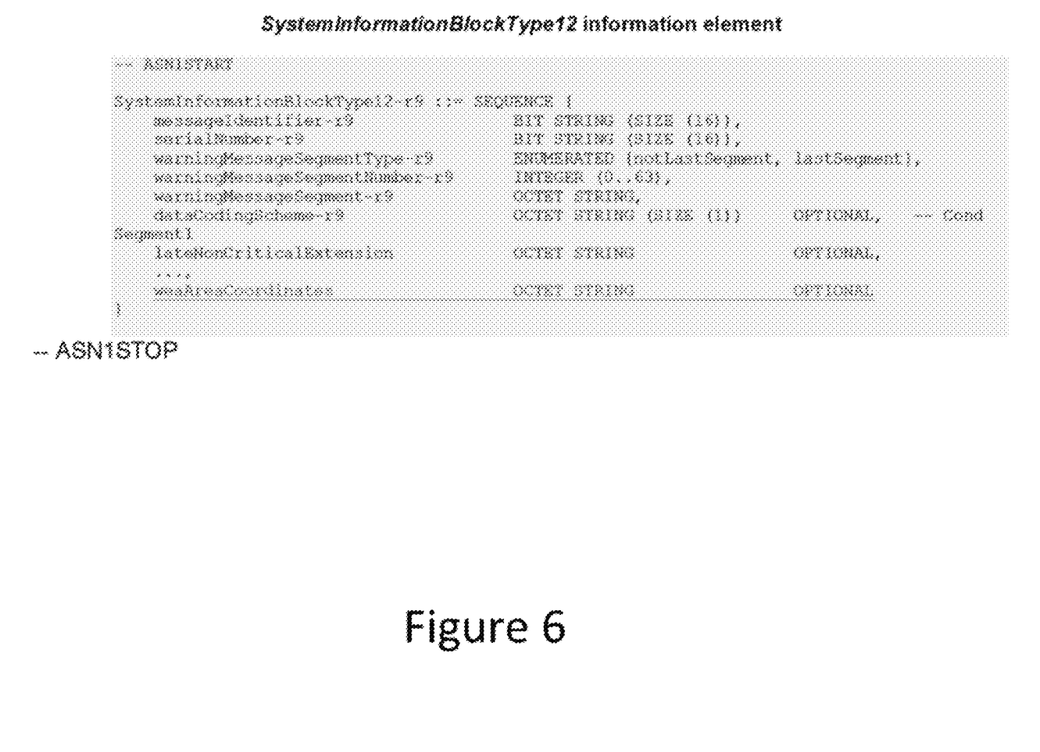
FIG. 6 illustrates how a WEA area coordinates field can be added to SIB12, according to certain embodiments.

The new field WEA area coordinates can be added to the SIB12. FIG. 6 illustrates how a WEA area coordinates field can be added to SIB12, according to certain embodiments.

Instead of adding the weaAreaCoordinates to SIB12, a new SIB can be defined that carry all the parameters from SIB12 and the weaAreaCoordinates. The way the ASN.1 was initially defined (the presence of " . . . "), it should be possible to add the new field to the SIB12 without causing a backward compatibility issue. Using a new SIB may be more expensive implementation.

Figure 7:
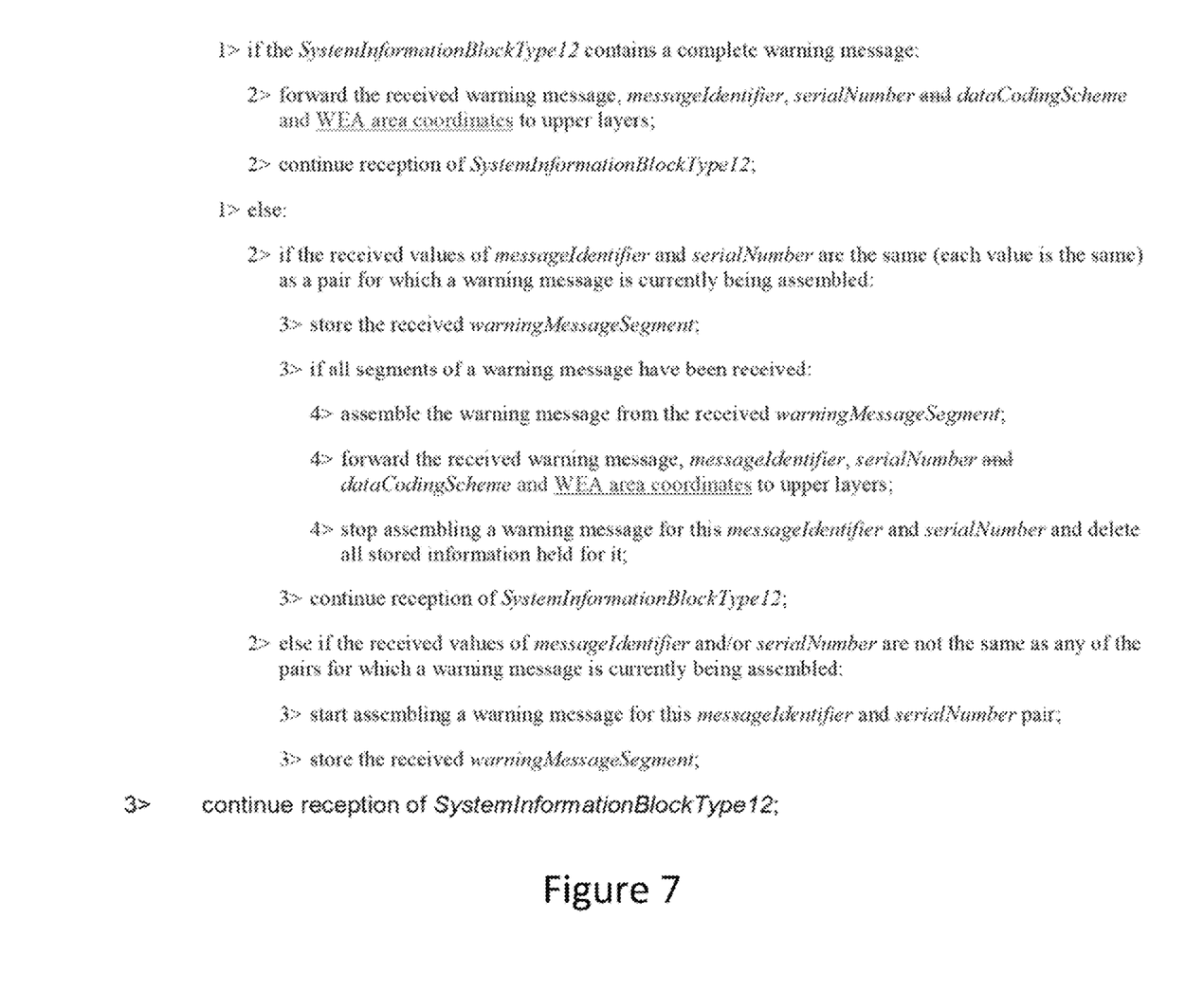
FIG. 7 illustrates pseudo-code of SIB12 handling, according to certain embodiments.

FIG. 7 illustrates pseudo-code of SIB12 handling, according to certain embodiments. If a new SIB is used, the pseudo code shown in FIG. 7 can become the pseudo code of that new SIB.

The upper layer processing is not defined in the 3GPP standards. The Alliance for Telecommunications Industry Solutions (ATIS) standard on Mobile Device Behavior standard can be modified to reflect the changes shown in FIG. 4.

An alternative approach would be to have WEA area coordinates within the WEA text message. If the WEA coordinates are sent to the mobile devices as a part of the WEA text message, then no changes may be necessary to the Federal Alert GW, CMSP GW, CBC, MME or the eNB. The composition of WEA area coordinates within the WEA text message can become part of alert originator's task.

Figure 8:
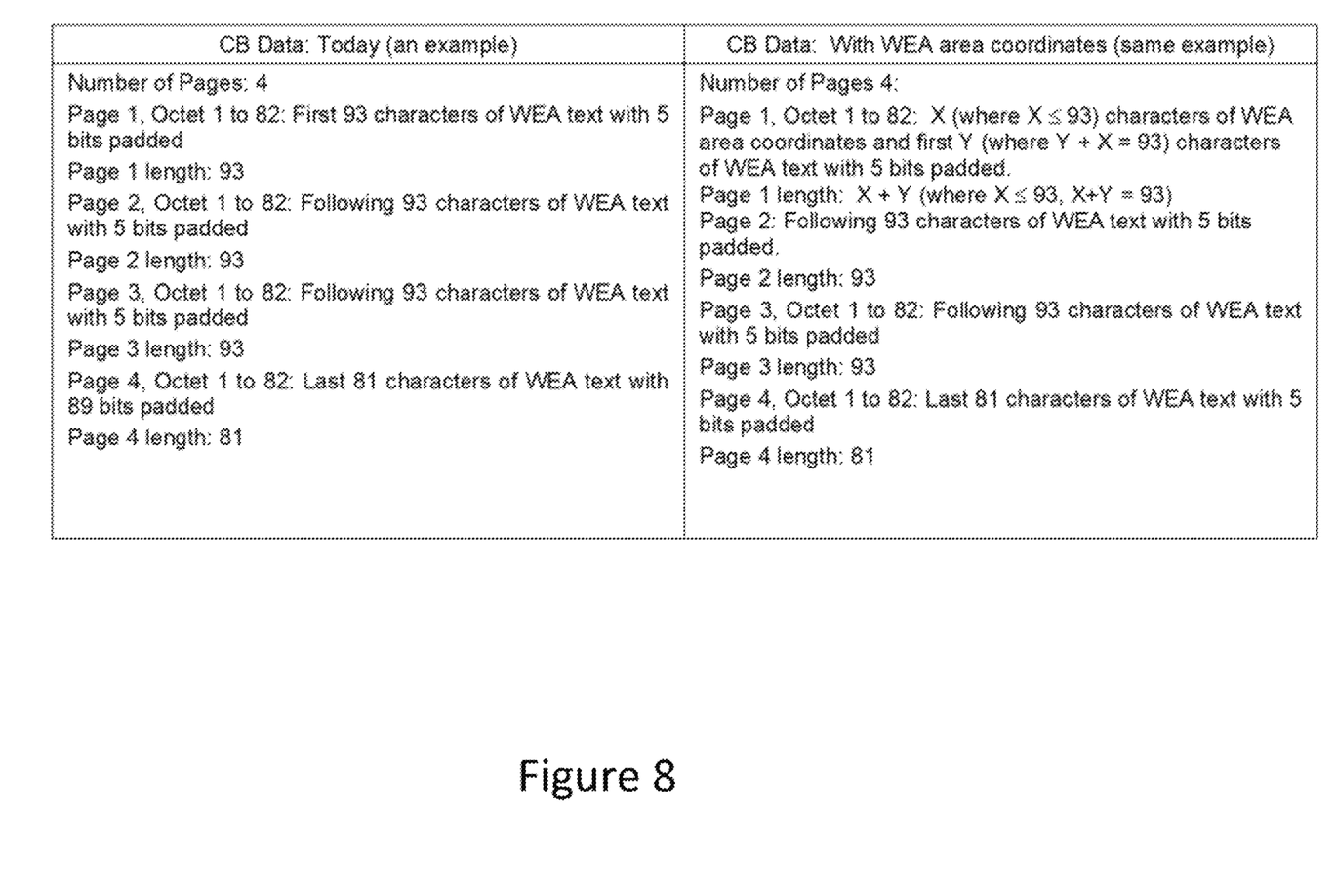
FIG. 8 illustrates a comparison of two example structures, according to certain embodiments.

However, the 3GPP specifications will have more impacts as new Message Identifiers will have to be added and the structure of the warning content will have to be defined to accommodate the WEA area coordinates. For example, FIG. 8 illustrates a comparison of two example structures, according to certain embodiments. This approach may assume the addition of 30 new Message Identifier values.

As can be seen in FIG. 8, in this particular approach the number of displayable characters are reduced from 360 to 360-X where X indicates the number of characters taken to populate the WEA area coordinates. The WEA area coordinates can be included in the first CB page. The mobile devices can read the characters from the first CB page and use the characters as WEA area coordinates. Furthermore, WEA area coordinates may also carry the information that tells the mobile devices how to extract the WEA area coordinates from the display characters.

FIG. 8 assumes that the same character set is used for the WEA area coordinates and the display text. However, a different method may have to be considered, for example, to represent the WEA area coordinates in a compressed form and the display text in GSM 7 bit. The approach will become more complex to send such multiple formats to the mobile devices.

The number of SIB segments needed to carry a 360-character message may change to accommodate the WEA area coordinates. Currently, it is assumed that about 12 to 14 octets (ATIS-0700023) are used to carry the following SIB12 header information: Message Identifier, 2 octets; Serial Number, 2 octets; Data Coding Scheme, 1 octet; and others, including Warning Message Segment Type, Warning Message Segment Number and Late Non Critical Extension, 8 octets.

When DCI type 1C is used (see 3GPP TS 36.331), each SIB segment can carry a maximum of 217 octets of data. With 14 octets taken for the overhead, about 203 octets are available to carry the warning message contents.

A 360-character WEA text message requires 4 CB pages. A WEA message that occupies 4 CB pages requires 333 octets (84+83+83+83). To carry 333 octets of CB data, 2 SIB segments of type 1C will be required. With the assumption that the first segment can carry the 217 octets (i.e. 203 octets of CB data), the remaining 130 octets of CB data will be transported in the second segment. The 130 octets of display text in the last segment will require about 144 octets and therefore, the two segments will have the following number of characters: First segment, 217 (14 header+203 CB data); and Second Segment, 144 (14 header+130 CB data).

Note that depending on the area, a SIB segment may not always be able to carry 217 octets of data. In that case, more SIB segments will be required to carry a 360-character WEA message.

In the enhanced SIB12, the WEA area coordinates can be transported as a separate element, and therefore, more octets may be required to cover the overhead. To understand the impact, an assumption will have to be made on the number of octets to be reserved for the WEA area coordinates. With the assumption that a maximum of up to 32 octets will be reserved to carry the WEA coordinates, the number of overhead octets will change from 14 to 46. That means with Type 1C, a total of 169 octets (217−46) per segment will be available to transport the CB data.

To carry 333 octets of CB data, 2 SIB segments of type 1C will be required. With the assumption that the first segment can carry the 217 octets (i.e. 169 octets of CB data), the remaining 164 octets of CB data will be transported in the second segment. 164 octets of display text in the last segment will require about 210 octets and therefore, the two segments will have the following number of characters: first segment, 217 (46 header+169 CB data); and second segment: 210 (46 header+164 CB data).

As an alternative, it is possible to define the SIB12 segments in such a way that WEA area coordinates are transported only in the first segment. With that approach, only 14 octets (as in the current method) will be required in the second segment to carry the overhead data. To realize this optional approach, perhaps no change will be required to the ASN.1 definition since the new weaAreaCoordinates can be introduced with an OPTIONAL tag.

As yet another alternative, it is possible to define the SIB12 segments in such a way that the WEA area coordinates are transported only in the second segment. With that approach, only 14 octets (as in the current method) will be required in the first segment to carry the overhead data. Since in the current method, only 130 octets of the second segment are used to carry CB Data out of the available 203 octets, one can presume that about 73 octets can be made available to carry the WEA coordinates. To realize this optional approach, perhaps no change will be required to the ASN.1 definition since the newAreaCoordinates can be introduced with an OPTIONAL tag.

The alternative approach described above will not have a new element in the SIB, and WEA area coordinates are carried at the expense of reduced number of display characters. Since the total number of CB data remain same as today, the impact on the SIB segment usage will be same as today.

On the other hand, if the alternative approach described above is further enhanced to carry the WEA area coordinates plus up to 360 characters of display characters, then the number of CB pages required will go up and accordingly will have an impact on the segment usage.

For example, taking the same example described above, if WEA area coordinates are specified with a maximum of 32 octets of data, then to carry 32 octets of WEA area coordinates (i.e. in GSM 7-bit format about 37 characters) and 360 characters of display text, the total number of GSM 7-bit characters will become 397 (360+37). To transport 397 of GSM 7-bit characters, 416 octets of CB data (ATIS-0700023) will be required. To transport 416 octets of CB data, with type 1C, 3 SIB12 segments will be required with the following distribution: first segment, 217 (14 header+203 CB data); second segment, 217 (14 header+203 CB data), and third segment, 24 (14 header+10 CB data).

Additional segment may have an impact on the time latency as more time will be required to broadcast the additional segment.

Figure 9:
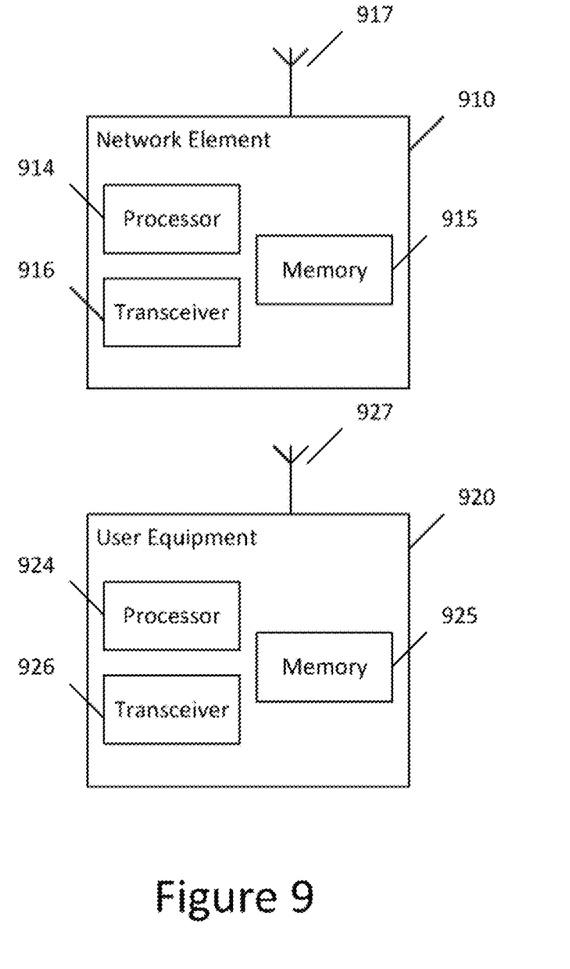
FIG. 9 illustrates a system according to certain embodiments.

FIG. 9 illustrates a system according to certain embodiments of the invention. It should be understood that each block of the flowchart of FIG. 4 may be implemented by various means or their combinations, such as hardware, software, firmware, one or more processors and/or circuitry. In one embodiment, a system may include several devices, such as, for example, network element 910 and user equipment (UE) or user device 920. The system may include more than one UE 920 and more than one network element 910, although only one of each is shown for the purposes of illustration. A network element can be an access point, a base station, an eNode B (eNB), or any other network element.

Each of these devices may include at least one processor or control unit or module, respectively indicated as 914 and 924. At least one memory may be provided in each device, and indicated as 915 and 925, respectively. The memory may include computer program instructions or computer code contained therein, for example for carrying out the embodiments described above. One or more transceiver 916 and 926 may be provided, and each device may also include an antenna, respectively illustrated as 917 and 927. Although only one antenna each is shown, many antennas and multiple antenna elements may be provided to each of the devices. Other configurations of these devices, for example, may be provided. For example, network element 910 and UE 920 may be additionally configured for wired communication, in addition to wireless communication, and in such a case antennas 917 and 927 may illustrate any form of communication hardware, without being limited to merely an antenna.

Transceivers 916 and 926 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 920 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 920 may be a sensor or smart meter, or other device that may usually be configured for a single location.

In an exemplifying embodiment, an apparatus, such as a node or user device, may include means for carrying out embodiments described above in relation to FIG. 1.

Processors 914 and 924 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 915 and 925 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 910 and/or UE 920, to perform any of the processes described above (see, for example, FIGS. 1, 10, and 11). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 9 illustrates a system including a network element 910 and a UE 920, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Figure 10:
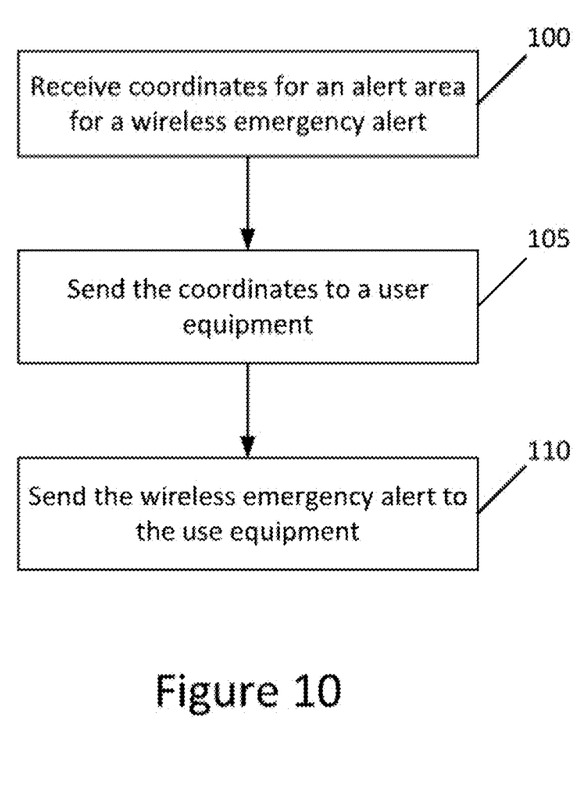
FIG. 10 illustrates an example flow diagram of a method according to certain embodiments.

FIG. 10 illustrates an example flow diagram of a method according to certain embodiments. In certain embodiments, the flow diagram of FIG. 10 may be performed by a network entity, network node, or access node in a 3GPP system, such as LTE or 5G new radio (NR). For instance, in some example embodiments, the method of FIG. 10 may be performed by a base station or access node, eNB or gNB.

According to one example embodiment, the method of FIG. 10 may initially, at 100, include receiving, at an access node, coordinates for an alert area for a wireless emergency alert. The method may also include, at 105, sending, from the access node, the coordinates to a user equipment. In addition, the method may include, at 110, sending the wireless emergency alert to the user equipment. According to certain example embodiments, the coordinates may be sent in a system information block. In other example embodiments, the coordinates may be sent together with the wireless emergency alert.

Figure 11:
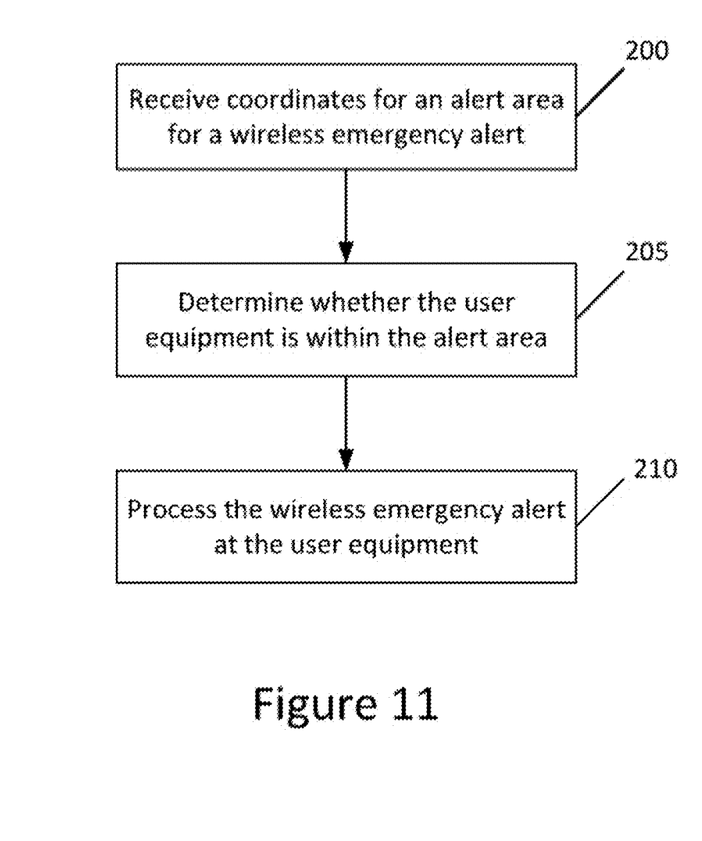
FIG. 11 illustrates an example of a flow diagram of another method according to certain embodiments.

FIG. 11 illustrates an example flow diagram of another method according to certain embodiments. In certain example embodiments, the flow diagram of FIG. 11 may be performed by a mobile station and/or UE, for instance. According to one example embodiment, the method of FIG. 11 may include initially, at 200, receiving, at a user equipment, coordinates for an alert for a wireless emergency alert. The method may also include, at 205, determining, at the user equipment, whether the user equipment is within the alert area based on the coordinates. In addition, the method may include, at 210, processing the wireless emergency alert at the user equipment in accordance with the determination. In certain example embodiments, the coordinates may be received in a system information block. In other example embodiments, the coordinates may be received together with the wireless emergency alert.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

3GPP 3rd Generation Partnership Project
4G 4th Generation

ATIS Alliance for Telecommunications Industry Solutions
CBC Cell Broadcast Center
CBS Cell Broadcast Service
DCI Downlink Control Information
eNB enhanced Node B
ETWS Earthquake and Tsunami Warning System
E-UTRAN Evolved Universal Terrestrial Radio Access Network
FCC Federal Communications Commission
ID Identity or Identifier
Id Identity or Identifier
LTE Long Term Evolution
MME Mobility Management Entity
OMC Operations Maintenance Center
PWS Public Warning System
SIB System Information Block
TA Tracking Area
TS Technical Specification
WEA Wireless Emergency Alert
WRWR Write Replace Warning Request

We claim:

1. A method, comprising:
receiving, at an access node, coordinates for an alert area for a wireless emergency alert;
sending, from the access node, the coordinates to a user equipment via a cell broadcast service; and
sending the wireless emergency alert to the user equipment via the cell broadcast service, wherein the coordinates and the wireless emergency alert are sent separately from each other, wherein the coordinates are sent in a separate field of a segment within a system information block, wherein a number of segments in the system information block changes depending on an ability of the system information block to accommodate the coordinates, and wherein the coordinates are sent in the separate field of the segment within the system information block after an extensibility marker " . . . " of an abstract syntax notation one (ASN.1) code.

2. A method, comprising:
receiving, at a user equipment, coordinates for an alert area for a wireless emergency alert via a cell broadcast service; receiving, at the user equipment, the wireless emergency alert via the cell broadcast service; determining, at the user equipment, whether the user equipment is within the alert area based on the coordinates; and processing the wireless emergency alert at the user equipment in accordance with the determination, wherein the coordinates and the wireless emergency alert are received separately from each other, wherein the coordinates are received in a separate field of a segment within a system information block, wherein a number of segments in the system information block changes depending on an ability of the system information block to accommodate the coordinates, and wherein the coordinates are received in the separate field of the segment within the system information block after an extensibility marker " . . . " of an abstract syntax notation one (ASN.1) code.

3. An apparatus, comprising: at least one processor; and at least one memory comprising computer program code, the at least one memory and the computer program code are configured, with the at least one processor to cause the apparatus at least to receive coordinates for an alert area for a wireless emergency alert; send the coordinates to a user equipment via a cell broadcast service; and send the wireless emergency alert to the user equipment via the cell broadcast service, wherein the coordinates and the wireless emergency alert are sent separately from each other, wherein the coordinates are sent in a separate field of a segment within a system information block, wherein a number of segments in the system information block changes depending on an ability of the system information block to accommodate the coordinates, and wherein the coordinates are sent in the separate field of the segment within the system information block after an extensibility marker " . . . " of an abstract syntax notation one (ASN.1) code.

4. An apparatus, comprising: at least one processor; and at least one memory comprising computer program code, the at least one memory and the computer program code are configured, with the at least one processor to cause the apparatus at least to receive coordinates for an alert area for a wireless emergency alert via a cell broadcast service;
receive the wireless emergency alert via the cell broadcast service; determine whether the apparatus is within the alert area based on the coordinates; and process the wireless emergency alert in accordance with the determination, wherein the coordinates and the wireless emergency alert are received separately from each other, wherein the coordinates are received in a separate field of a segment within a system information block, wherein a number of segments in the system information block changes depending on an ability of the system information block to accommodate the coordinates, and wherein the coordinates are received in the separate field of the segment within the system information block after an extensibility marker " . . . " of an abstract syntax notation one (ASN.1) code.

* * * * *